United States Patent [19]

Bizzarri

[11] Patent Number: 5,732,268
[45] Date of Patent: Mar. 24, 1998

[54] EXTENDED BIOS ADAPTED TO ESTABLISH REMOTE COMMUNICATION FOR DIAGNOSTICS AND REPAIR

[75] Inventor: Maurice W. Bizzarri, Palo Alto, Calif.

[73] Assignee: Award Software International, Mt. View, Calif.

[21] Appl. No.: 608,028

[22] Filed: Feb. 26, 1996

[51] Int. Cl.[6] .................................................. G06F 11/34
[52] U.S. Cl. ........................................... 395/652; 395/712
[58] Field of Search ................................. 395/652, 712, 395/704

[56] References Cited

U.S. PATENT DOCUMENTS

| | | | |
|---|---|---|---|
| 5,280,627 | 1/1994 | Flaherty et al. | 395/652 |
| 5,452,454 | 9/1995 | Basu | 395/652 |
| 5,596,711 | 1/1997 | Burckhartt et al. | 395/182.21 |

Primary Examiner—Emanuel T. Voeltz
Assistant Examiner—John Q. Chavis
Attorney, Agent, or Firm—Donald R. Boys

[57] ABSTRACT

An extended basic input output system (E-BIOS) has a first portion of code for providing power-on self-test (POST) and boot functions for a first computer, including code for sensing if the first computer does not boot. In the event of failure to boot, a second portion of code in the E-BIOS directs establishing communication link with a remote diagnostics and repair computer. When communication is established, a master code kernel at the diagnostics and repair computer may be executed to download a slave kernel to random access memory of the first computer, blowing an automatic software kernel or an operator at the diagnostics and repair computer to access and modify code and data in memory devices of the first computer, and to reboot the first computer after repair. Communication links may be by telephone modem, either analog or integrated Services Digital Network (ISDN), or by network links. In one embodiment cooperation between the slave kernel and the master kernel is such that an operator may operate the diagnostics and repair computer as though it were the first computer.

20 Claims, 3 Drawing Sheets

EXTENDED BIOS ADAPTED TO ESTABLISH REMOTE COMMUNICATION FOR DIAGNOSTICS AND REPAIR

FIELD OF THE INVENTION

The present invention is in the area of apparatus and methods for diagnosing and repairing failed computer systems, and pertains more particularly to computer code for basic input output systems (BIOS) devoted to diagnosis and repair.

BACKGROUND OF THE INVENTION

Because a computer, without operating instructions loaded, is essentially a piece of dumb hardware, there must be some relatively standard set of beginning instructions for the computer to follow, readily accessible and loadable into the computer's operating memory to direct the process of testing the computer's hardware and connectivity, and then loading all of the various operating code that is necessary for the computer to perform useful tasks. Typically this beginning code is called a basic input output system (BIOS), which includes a power-on self-test (POST) procedure, to assure that all circuits are active, properly connected, and functional before attempting to load and initiate all of the code needed to operate.

The BIOS in most instances is a relatively short code set embedded in a non-volatile, read-only memory (ROM), such as an electrically-erasable programmable read-only memory (EEPROM), accessible to the central processing unit (CPU) of a computer at the instant of power on. Partly because code can be accessed and executed from random access memory (RAM) more quickly than from read-only memory (ROM), the BIOS code is typically loaded immediately into RAM from ROM at power on, and executed from RAM.

Although BIOS is fundamental to testing a computer's operating equipment and basic BIOS functions continue to be used during subsequent operation, BIOS is not a sufficient system for continuing successful system operations. There are many functions, among them reading and writing data to mass storage systems such a floppy disk drives (FDD), hard disk drives (HDD) and CD-ROM drives, which have to be loaded as well after executing the initial BIOS to render a computer fully operable. All of the code to make the computer capable of performing such basic functions is referred to in the art as the Operating System (OS).

In very early personal computers, before widespread use of hard disk drives (HDD), an operating system such as the IBM-compatible Disk Operating System (DOS) would typically be recorded on a floppy disk along with an application such as a word processor or a spread-sheet program. A floppy disk with DOS and a boot sector was called a Boot disk, and the name is still used, although operating systems and boot sectors are typically now recorded on hard disk drives. One would place a boot disk in a floppy drive in the computer, then turn the thing on. The BIOS would load from a resident ROM, perform a simple POST routine, then poll the floppy drives (often there was only one) to find DOS. When Dos was located, the BIOS would cause it to be loaded, and then present the DOS prompt for instruction from the user. BIOS code and DOS would remain in RAM for access by the CPU as needed for basic and routine functions. The user could then boot the word processor or other application on the floppy and go to work.

In this early and simple scenario, if DOS code on a boot disk were to become corrupted, the computer would not boot, and one could simply remove the boot disk from the floppy drive, place another in its place, and try again. Once a usable DOS was loaded, one could present different disks to the floppy drive(s) for access to applications and data files.

Things in a sense are not a lot different now. The principle differences are that mass storage devices have evolved and operating systems and applications are much larger and more complicated.

The motivation for evolution is functionality. As developers have envisioned ever more elaborate and intricate computer-related goodies such as high-resolution, color displays, CD-rom drives, high-density hard disk drives, menu-driven user interfaces, windows-type interfaces, modem communications, the Internet and the World-Wide-Web, and much more, it has been necessary to develop faster and more powerful CPUs, Higher density and faster mass storage, and ever-larger operating systems.

Because of the large size of operating systems today, such as Windows™ and UNIX™ systems for example, it is completely impractical to store the operating system on a floppy disk or in ROM, although some minimum versions of some operating systems are available in ROM for specialized purposes. Operating systems are therefore stored in non-volatile mass storage, typically on a hard disk. In such a system, at power on or reset, the BIOS ROM is accessed first, loaded into RAM, and executed. After POST, a BIOS code causes the system to access a local hard disk at an address, typically called the boot sector, where code is stored for directing loading of the operating system from the hard disk and finalizing preparation of the system for continuing operation. The operating system, which may be several megabytes of code, is then loaded, and the system is directed to a starting point for operator instructions, which may be with an application loaded and ready to run, or at a point where an operator may select an application.

For those familiar with DOS operation the point that the user is able to select and manipulate operation is the familiar DOS prompt. For those familiar with Microsoft Windows™ this point is the familiar interactive interface showing ICONS for program groups. For Apple Macintosh™ users this point is the familiar Desktop graphics interface.

As long as all hardware and software systems are operable, such an initiation sequence is routine. A hard disk drive, however, is a mechanical device, and thus vulnerable to a much broader variety of potential difficulties than an IC ROM. Because of this mechanical vulnerability, it often happens that a system cannot boot because the boot disk becomes inoperable. There are many other hardware failures that might occur other than the failure of a hard disk that would prevent a PC from booting and operating as intended.

As well as hardware-only failures, there are many situations that can occur to render software corrupted, which condition may leave a PC unable to boot, such as corruption of the boot sector of the hard disk boot drive, or corruption of a File Allocation Table (FAT).

Early PCs were self-sufficient, stand-alone systems, comprising all of the hardware and software necessary to perform intended functions. PCs at the time of the present invention, however, are typically provided with some form of communication link to other computers. Most PCs at a minimum have a telephone modem connection, and may communicate with another computer over a telephone line in either an analog or a digital protocol.

PCs used in a business setting are often connected together in a local area network (LAN), whereby individual workstations may have relatively fewer hardware components and devices and much less locally-stored software, and hardware and software resources are shared on the LAN.

In any setting, stand-alone, modem connected, or LAN connected, the conventional procedure in many cases for dealing with a computer that won't boot is for a maintenance person to visit the failing PC with hardware and software tools. The maintenance person can boot the offending PC typically via one of the floppy drives, using a floppy boot disk with an operating system such as DOS that is small enough to store on the floppy, load diagnostic routines, determine the fault or faults, and perform the needed repairs. This system-manager approach to maintenance is a time-consuming and person-oriented approach, and is therefore expensive and time-consuming.

There is a conventional diagnostic system called Simple Network Management Protocol (SNMP), well-known in the art, that allows a service person at a remote site to communicate with a troubled PC and to perform some alterations, but SNMP requires that at least a minimum operating system be active and operable in the troubled PC. For those cases in which a PC will not boot, SNMP has no value.

What is needed for those PCs having some mode of communication with other devices, either via modem or on a LAN, is an apparatus and method whereby, in the event of failure and an inability to boot, a remote diagnostic center may be contacted automatically, and a remote boot, called an extended boot by the inventor, may be performed, through which the failed machine may be remotely diagnosed and placed back in operating condition, saving the expense and time of sending a repair person to the failed machine.

In embodiments of the present invention such a needed system is initiated by code in a unique local BIOS, called E-BIOS, for Extended BIOS, by the inventor. In the event of failure to boot properly, the E-BIOS establishes a communication link with a designated remote diagnostics and repair console.

In one embodiment code to boot the failed machine is downloaded from the remote center to the failed local PC by an operator at the remote facility, and diagnostics for the failed system may be managed at the remote facility.

SUMMARY OF THE INVENTION

In an embodiment of the invention a basic input output system (BIOS) is provided comprising a non-volatile memory; a first code portion recorded in the non-volatile memory and adapted for execution by a CPU to perform startup functions for a computer, including initiating boot operations; and a second code portion recorded in the non-volatile memory and adapted for execution by the CPU to establish communication with a remote computer. Code execution by the CPU is directed from the first portion to the second portion upon failure to complete the boot operations. Communication with the remote computer may be established over a telephone link by operating a telephone modem to dial a telephone number, using either an analog or digital line, and in some embodiments plural numbers may be dialed in a priority sequence until a connection is established. Communication may be established as well over any network connection to remote computers.

In an alternative embodiment a computer is provided comprising a CPU; a mass storage device coupled to the CPU and having a boot code sector and operating system code recorded thereon; a read-only memory ROM device coupled to the CPU; and a basic input output system (BIOS) coupled to the CPU, the BIOS having a first code portion recorded in the ROM device and adapted for execution by the CPU to perform startup functions for a computer, including initiating boot operations, and a second code portion recorded in the ROM device and adapted for execution by the CPU to establish communication with a remote computer. Code execution by the CPU is directed from the first code portion to the second code portion upon failure to complete said boot operations.

In computers according to various embodiments of the invention, connection may be by telephone modem, analog or digital, or by network link, depending on availability.

Automatic connection of a failing computer to a remote diagnostics and repair computer through a communication link provides a system for modifying code and data in a first computer having a first CPU upon failure of the first computer to boot, comprising a second computer having a second CPU, the second computer connected to the first computer by a communication link; a master code kernel and a slave code kernel stored on a memory device at the second computer; and an extended basic input output system (E-BIOS) in the first computer. Upon sensing failure of the first computer to boot, the E-BIOS establishes communication with the second computer over the communication link, and the second CPU in response causes a copy of the slave kernel to be copied to the RAM of the first computer and to be made available to the first CPU for execution, and wherein, with a copy of the slave kernel in the first computer and the master kernel active in the second computer, a user at the second computer may diagnose and modify code and data in the first computer from the second computer.

An operator or automatic software at the second computer in this aspect may repair a corrupted boot sector on a disk drive of the first computer, or modify code of file allocation tables at the first computer.

In another aspect a method of diagnosing and modifying code and data in read/write memory devices and mass storage devices of a first computer is provided, comprising steps of (a) establishing communication with the first computer over a communication link from a diagnostic and repair computer; (b) loading and executing a master kernel at the diagnostic and repair computer; (c) downloading a slave operating system kernel to the first computer from the second computer; and (d) accessing and modifying code and data on read/write memory devices and mass storage devices in the first computer through activity at the second computer. The first computer may be caused to attempt to reboot after step (d). A method for establishing contact with a remote repair center computer upon failure of a local computer to boot is provided in yet another aspect, comprising steps of: (a) sensing failure of the local computer to boot through action of a first portion of code in an extended basic input output system (E-BIOS) installed and operable in the first computer; and (b) activating a communication link to the remote repair center computer through action of a second portion of code in the E-BIOS, the second potion of code executed in response to the failure of the first computer to boot.

The embodiments of the present invention and methods of practicing the invention provide a unique system and protocol for accessing, diagnosing and repairing computers that fail to boot, without the expensive and time-consuming step of sending a technician or engineer to the failed computer to reboot the computer from a floppy, and to then diagnose and modify corrupted code and data.

DESCRIPTION OF THE PREFERRED EMBODIMENTS

Figure 1:
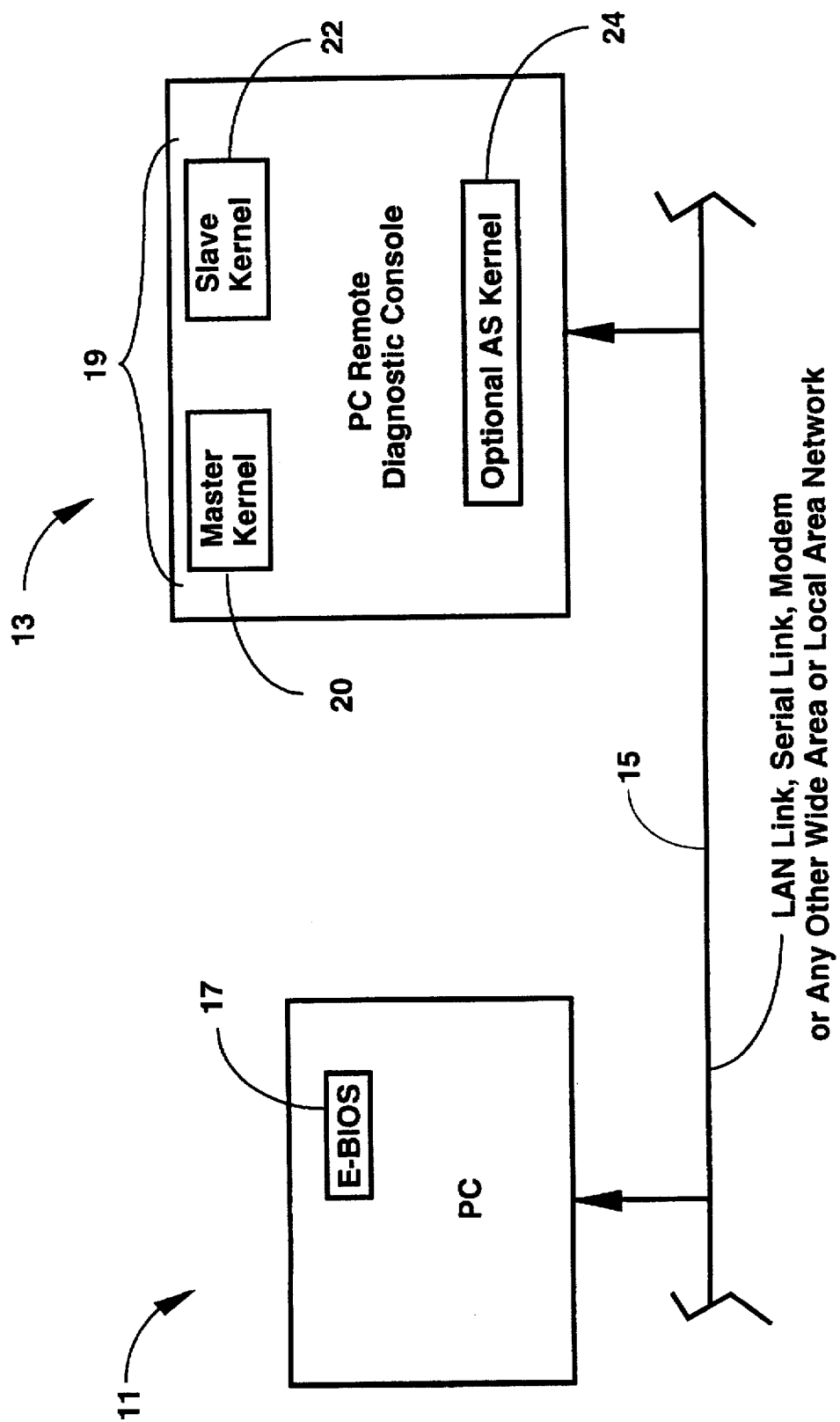
FIG. 1 is a block diagram of an E-BIOS PC, an E-BIOS diagnostic center, and interconnection according to an embodiment of the present invention.

FIG. 1 is a block diagram of a local E-BIOS PC 11 connected to a remote E-BIOS diagnostic and repair facility 13 by a communication link 15. A means of communicating is necessary for practicing the invention, but link 15 can be any of several well-known types, such as a serial link, a telephone modem connection, or a wide-area or a local area network connection. PC 11 has a unique E-BIOS 17 rather than a conventional PC BIOS, and facility 13 is equipped with code for cooperating with E-BIOS PC 11 over connection 15. This E-BIOS code in FIG. 1 is designated E-BIOS Host 19, and comprises a master kernel 20 and a slave kernel 22.

There are, in different embodiments of the present invention, at least two different ways that a diagnostic and repair facility 13 may operate. In one option, after connection is established, a human operator directs all interaction with the PC needing repair or modification to boot and operate properly. In another option, an automatic software (AS) kernel 24 is provided to deal with the problems of the failed PC, and no human intervention is necessary.

There are a number of possible reasons why an E-BIOS PC might fail to boot. Perhaps chief among these, without regard to importance, are (1) a physical failure of the boot drive, (2) code corruption in the boot sector of the boot drive, (3) corruption of the file allocation table (FAT), (4) BIOS setup corrupted (usually in real-time clock, and often called CMOS), and (5) a virus infection affecting code and/or data in CMOS or on a hard disk. In case (1) the necessary correction cannot be made from the remote location, and it is necessary to send a technician to the failed computer to physically repair or change out the offending drive. In the cases of (2), (3), (4), and (5) diagnosis and repair can be made by methods of the present invention.

In considering the relative importance or desirability of an automatic software kernel or human-directed operation, one attractive alternative is to provide, for a number of PCs, a diagnostic center wherein some PCs are equipped with the AS interface and some are human-directed. Such a center would vary in number of PCs depending on the service base, and efficiency in response and service is provided by having the AS PCs respond first to incoming requests for service. The AS PCs in this case are programmed to look for and fix problems associated with the five common problems listed above. In the event an AS PC cannot modify a failed PC to reboot, control is passed to a facility with a human-operator, who can then look for more unusual and difficult problems. In this sort of facility there would be more AS PCs than human-directed, with a ratio of perhaps 5:1, depending on experience.

Regardless of the number of E-BIOS PCs and E-BIOS diagnostic and repair facilities involved, however, the basic operation involves an operator or automatic software at a diagnostic and repair facility cooperating with a failed PC to get the failed machine operable again without the necessity of sending a repair technician to the offending machine.

Figure 2:
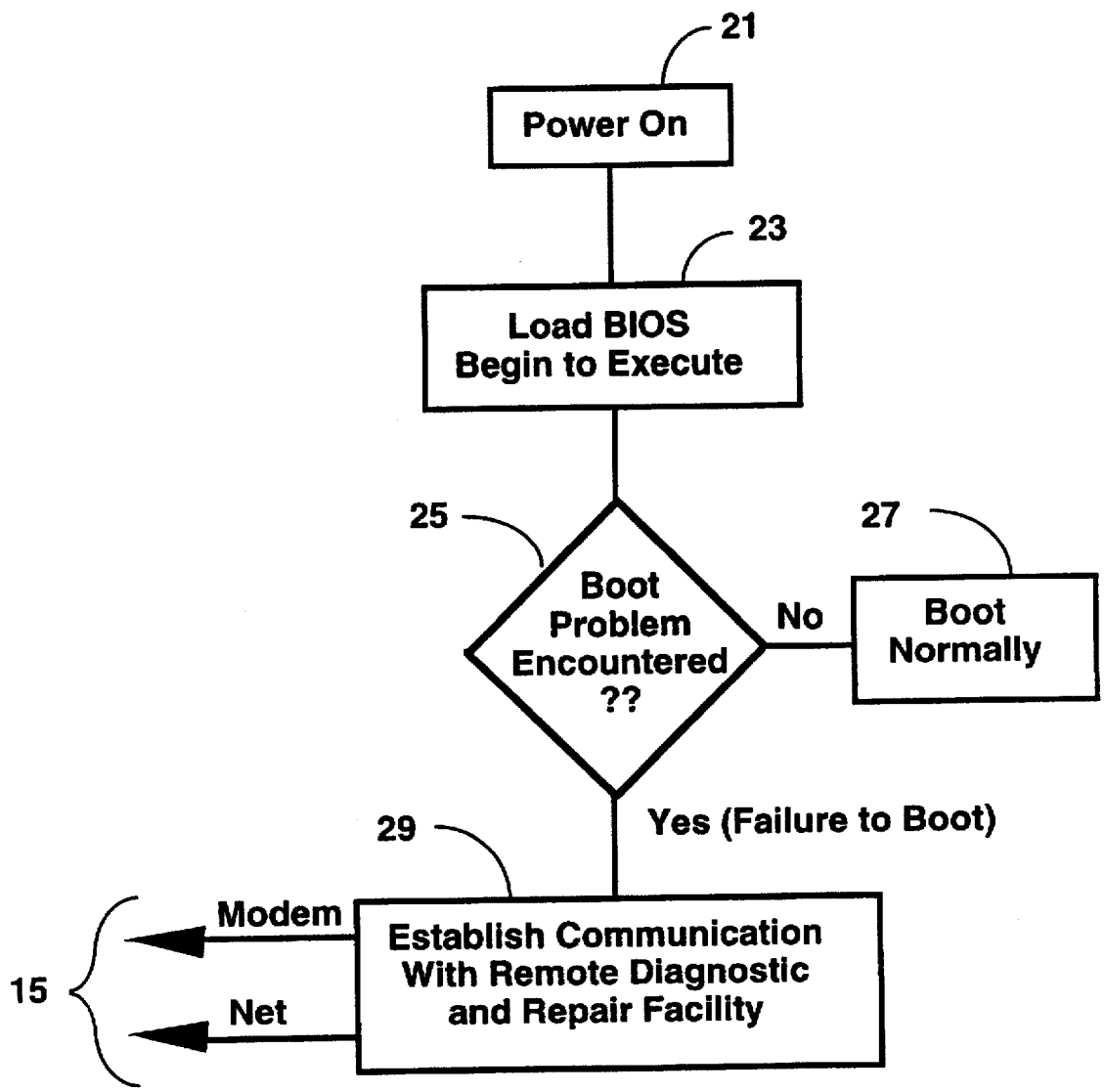
FIG. 2 is a logic flow diagram of operation of an E-BIOS PC at boot up.

FIG. 2 is a logic flow diagram of operation of an E-BIOS PC at boot up, executing E-BIOS code. At step 21 power on is initiated. This may be from turning on the computer after a period of the computer being off, an intentional reboot occasioned by a keystroke combination or other signal, or a reboot as a result of the Power Good line going low may reason for a time sufficient to cause a reboot.

At step 23 the E-BIOS is loaded into RAM and execution of the E-BIOS begins. At step 25 E-BIOS execution continues, performing POST and other BIOS startup functions, and, by virtue of being an E-BIOS, monitoring for any fault that will prevent completion of the boot process. As long as no fault is found that will prevent normal system operation, the boot process continues, including accessing the boot sector of a boot drive hard disk and loading code constituting an operating system from the boot drive.

If, in the duration of the boot process, no fault is encountered which would prevent normal system operation, boot proceeds at step 27 to presenting on a display monitor the interactive interface allowing a user to take over and direct continuing operation. This point is the DOS prompt, the Windows™ interface, the Mac desktop, and so forth.

If, in the processes at step 27, a fault is encountered that would prevent normal operation, control is diverted to step 29, and specific code in the E-BIOS queries for a modem or a LAN connection, and finding one or the other, establishes communication with a remote E-BIOS diagnostic and repair unit (element 13 in FIG. 1). There are a number of options for the connection code. For example, a specific phone number or numbers may be programmed into a device accessible by the E-BIOS, and the numbers may have priority, such that the E-BIOS may try the numbers in a priority order. This is useful for situations wherein maintenance personnel may be off-site, and there is no certainty as to availability. When a qualified person answers such a call, he or she returns a preprogrammed signal. In the case of a LAN connection, there may be a specific node on the LAN designated as the diagnostic and repair site, or there may be several, again with a priority list accessible to the E-BIOS of the PC that fails to boot.

It will be apparent to those with skill in the art that there are a broad variety of options that may be used by the E-BIOS to establish contact with a designated diagnostic and repair center.

Depending on the specific embodiment, a user or an automatic software kernel at a remote unit 13 is notified of a machine in need of service in one or more of a variety of ways. In the case of a large commercial network, there may be a specific node designated as the diagnostic and repair center, and this node may be in service at all times with a technician in attendance and the E-BIOS host active. In this case, when a PC on the LAN goes down and can't reboot, and the E-BIOS at the failed PC signals for remote service, an on-screen message can be used to alert the service technician, perhaps coupled with an audio signal. In situations where a service technician might be running another program at the time a request is logged, there can still be an on-screen message or icon to alert the technician to boot the host software and initiate diagnosis and repair for the offending PC.

In some cases, for example wherein an E-BIOS PC needs service and the E-BIOS calls a remote designated location by modem, a message may be left for a technician to access on return, who may then call the failed modem which is maintained in an answer mode by the E-BIOS until the service technician returns the call. Contact is then established and remote diagnosis and repair may proceed.

In the specific situations described above, operation of diagnosis and repair is performed by a trained technician at the remote diagnostic and repair PC. In an alternative embodiment operation is by an automatic software kernel.

Figure 3:
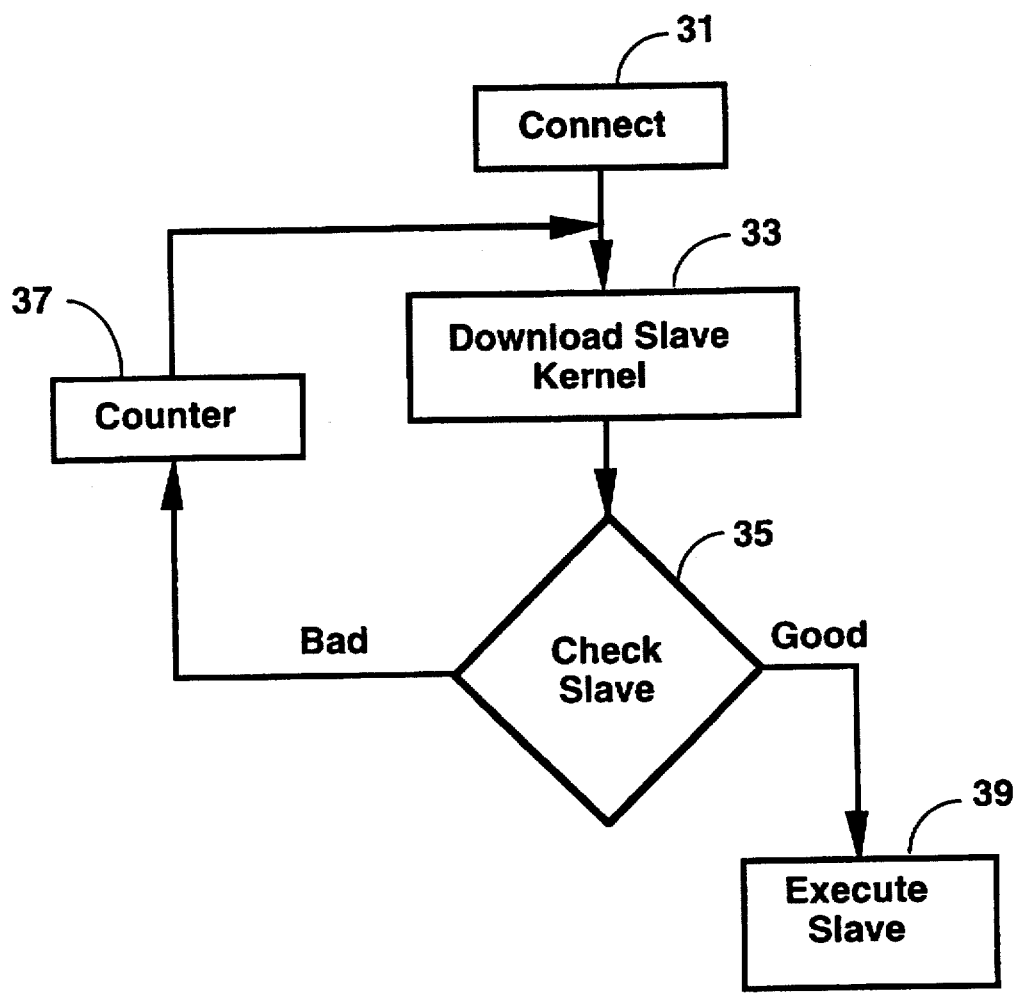
FIG. 3 is a logic flow diagram of operation of diagnosis and repair after an E-BIOS PC and an E-BIOS diagnostic center are connected.

FIG. 3 is a logic flow diagram of operations between a failed E-BIOS PC 11 and a remote diagnostics and repair PC 13 (FIG. 1) in an embodiment of the invention after the E-BIOS host is active on the diagnostics and repair PC and communication has been established with the failed E-BIOS PC. At step 31 communication is established. At step 33 slave kernel 22 is downloaded from diagnostic and repair PC 13 over link 15 to failed PC 11. In human-operated embodiments the downloading is initiated by the human operator. In automatic operation the downloading is directed by AS kernel 24 (FIG. 1).

At step 35 an attempt is made to execute slave kernel 22 in RAM space of failed PC 11. If the slave fails, control returns to step 33, and another download is initiated. Under human control this reboot process for the slave kernel may be repeated any number of times at the discretion of the operator. Under AS control a counter 37 records the number of tries, and aborts at some preprogrammed integer, such as three.

When and if at step 35 the slave is determined to be operable, control proceeds to step 39, and the slave is manipulated to diagnose and repair the failed PC.

Considering an embodiment of the invention under human control, after slave kernel 22 is downloaded and tested, an interface at the diagnostic PC is provided emulating the keyboard, screen, and floppy drive of the failed computer, providing a local environment at the diagnostic PC just as if the technician has traveled to the failed PC (which may be miles away) and is interfacing with the failed unit directly. Under this circumstance the repair technician may load floppy disks and diagnose and repair the failed PC as though he or she were directly operating the failed PC. The technician may, for example, load a DOS boot disk, and boot the failed PC from the floppy drive of the remote diagnostic and repair PC. He or she may then run diagnostic and repair programs such as FDISK, CHKDISK, and SCANDISK, which are familiar to user's of DOS and Windows™ programs. Similar diagnostic programs are available and may be used in other embodiments. Operations at the diagnostic and repair PC are transferred via the master kernel running on the diagnostic and repair PC via link 15 to the failed PC, and by virtue of the slave kernel operating there, directed to the appropriate hardware devices and addresses at the failed PC. In this instance, when one uses the A: floppy drive at the remote unit, the linked system operates as though that is the A: drive at the linked, failed PC.

In addition to diagnosing and repairing code and data on a hard disk, other functions may be performed from the diagnostic and repair PC after connection and establishing the slave kernel on the failed PC. Among these are remote operation of all interactive BIOS functions, retrieval and restoration of files on local media, running diagnostics (as described above), retrieval of system configuration information, such as system registry, CMOS, desktop management files (DMI), and any other information typically available to the BIOS or operating system.

It will be apparent to those with skill in the art that there are many alterations that may be made in embodiments of the present invention described herein without departing from the spirit and scope of the invention. There are, for example, many alternative ways that code might be generated to accomplish the functions of the invention. It is well known to those with the skill in the art that the same functions can be performed by code written in many different ways. A variety of diagnostic and repair functions may be incorporated into different embodiments of the invention, and a number of these have been described above. Other alternatives include a variety of communication links, a variety of mixes of designated repair facilities, a variety of user interfaces that may be presented by the master kernel at the remote diagnostic and repair PC, and other alternatives as well. The scope of the invention is limited only by the claims which follow.

What is claimed is:

1. A basic input output system (BIOS) comprising;
   a first code portion adapted for execution by a CPU to perform power on self test (POST) routine and to initiate boot operations; and
   a second code portion adapted for execution by the CPU to establish communication with a remote computer;
   wherein code execution by the CPU is directed from the first portion to the second portion upon failure to complete said boot operations.

2. A BIOS as in claim 1 wherein the second portion directs the CPU to establish communication with a remote computer through a telephone link by operating a telephone modem to dial a telephone number.

3. A BIOS as in claim 2 wherein the second portion directs the CPU to access a priority record of telephone numbers, and to dial the telephone numbers in order of priority until a call is answered and a pre-programmed signal is returned.

4. A BIOS as in claim 1 wherein the second portion directs the CPU to establish communication with a remote computer through a network communication adapter.

5. A BIOS as in claim 1 wherein the non-volatile memory is an integrated circuit read-only memory (ROM) including Flash memory.

6. A computer comprising:
   a CPU;
   a mass storage device coupled to the CPU and having a boot code sector and operating system code recorded thereon; and
   a basic input output system (BIOS) coupled to the CPU, the BIOS having a first code portion adapted for execution by the CPU to perform power on self test (POST) routine and to initiate boot operations, and a second code portion adapted for execution by the CPU to establish communication with a remote computer;
   wherein code execution by the CPU is directed from the first code portion to the second code portion upon failure to complete said boot operations.

7. A computer as in claim 6 wherein the second code portion directs the CPU to establish communication with a remote computer through a telephone link by operating a telephone modem to dial a telephone number.

8. A computer as in claim 7 wherein the second portion directs the CPU to access a priority record of telephone numbers, and to dial the telephone numbers in order of priority until a call is answered and a pre-programmed signal is returned.

9. A computer as in claim 6 wherein the second portion directs the CPU to establish communication with a remote computer through a network communication adapter.

10. A system for modifying code and data in a first computer having a first CPU upon failure of the first computer to boot, comprising:
    a second computer having a second CPU, the second computer connected to the first computer by a communication link;

a master code kernel and a slave code kernel stored on a memory device at the second computer; and an extended basic input output system (E-BIOS) in the first computer;

wherein, upon sensing failure of the first computer to boot, the E-BIOS establishes communication with the second computer over the communication link, and the second CPU in response causes a copy of the slave kernel to be copied to the RAM of the first computer and to be made available to the first CPU for execution, and wherein, with a copy of the slave kernel in the first computer and the master kernel active in the second computer, a user at the second computer may diagnose and modify code and data in the first computer from the second computer.

11. A system as in claim 10 wherein the communication link is one of an Integrated Services Digital Network (ISDN) and an analog telephone line.

12. A system as in claim 11 wherein the first CPU accesses a priority record of telephone numbers, and dials the telephone numbers in order of priority until a call is answered and a pre-programmed signal is returned.

13. A system as in claim 10 wherein the communication link is a network link.

14. A system as in claim 10 wherein the master kernel and the slave kernel cooperate after communication is established to provide for the second computer to operate as though the second computer were the first computer.

15. A system as in claim 10 wherein an operator at the second computer may repair a corrupted boot sector on a disk drive of the first computer, and wherein an operator at the second computer may modify file allocation tables at the first computer.

16. A method for diagnosing and modifying code and data in read/write memory devices and mass storage devices of a first computer, comprising steps of:

(a) establishing communication with the first computer over a communication link from a diagnostic and repair computer;

(b) loading and executing a master kernel at the diagnostic and repair computer;

(c) downloading a slave operating system kernel to the first computer from the second computer; and (d) accessing and modifying code and data on read/write memory devices and mass storage devices in the first computer through activity at the second computer.

17. The method of claim 16 further comprising a step for causing the first computer to attempt to reboot after step (d).

18. A method for establishing contact with a remote repair center computer upon failure of a local computer to boot, comprising steps of:

(a) sensing failure of the local computer to boot through action of a first portion of code in an extended basic input output system (E-BIOS) installed and operable in the first computer; and (b) activating a communication link to the remote repair center computer through action of a second portion of code in the E-BIOS, the second potion of code executed in response to the failure of the first computer to boot.

19. The method of claim 18 wherein the communication link is a telephone modem link.

20. The method of claim 18 wherein the communication link is a network communication link.

* * * * *

UNITED STATES PATENT AND TRADEMARK OFFICE
CERTIFICATE OF CORRECTION

PATENT NO : 5,732,268
DATED : 04/03/98
INVENTOR(S) : Maurice W. Bizzarri

It is certified that error appears in the above-identified patent and that said Letters Patent is hereby corrected as shown below:

Line 10 of the Abstract now reads "to random access memory of the first computer, blowing an"

Line 10 of the Abstract should read "to random access memory of the first computer, allowing an"

Signed and Sealed this

Ninth Day of June, 1998

Attest:

BRUCE LEHMAN

Attesting Officer

Commissioner of Patents and Trademarks